(12) United States Patent
Kuo et al.

(10) Patent No.: US 8,730,201 B2
(45) Date of Patent: May 20, 2014

(54) TOUCH PANEL (75) Inventors: Wei-Hung Kuo, Hsin-Chu (TW);
Tun-Chun Yang, Hsin-Chu (TW);
Seok-Lyul Lee, Hsin-Chu (TW);
Wei-Ming Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 293 days.

(21) Appl. No.: 13/165,803

(22) Filed: Jun. 22, 2011

(65) Prior Publication Data

US 2012/0169628 A1 Jul. 5, 2012

(30) Foreign Application Priority Data

Dec. 30, 2010 (TW) .............................. 99147053 A (51) Int. Cl.
*G06F 3/041* (2006.01)
*G06F 3/044* (2006.01)

(52) U.S. Cl.
USPC ........................................................ 345/174

(58) Field of Classification Search
CPC ................................ G06F 3/041; G06F 3/044
USPC .......................................... 345/169, 173–176
See application file for complete search history.

(56) References Cited

U.S. PATENT DOCUMENTS

| 6,297,811 B1* | 10/2001 | Kent et al. ...................... 345/173 |
| 2008/0150906 A1* | 6/2008 | Grivna .......................... 345/173 |
| 2010/0020032 A1* | 1/2010 | Mamba et al. ................. 345/173 |
| 2010/0108409 A1* | 5/2010 | Tanaka et al. ............... 178/18.06 |

FOREIGN PATENT DOCUMENTS

| CN | 101739187 A | 6/2010 |
| TW | 201017501 | 5/2010 |

* cited by examiner

*Primary Examiner* — Andrew Sasinowski
(74) *Attorney, Agent, or Firm* — Winston Hsu; Scott Margo (57) ABSTRACT

A touch panel includes an insulating base, a plurality of first sensing electrodes, a plurality of second sensing electrodes and a plurality of third sensing electrodes. The insulating base has a first surface and a second surface. The first sensing electrodes and the second sensing electrodes are disposed on the first surface of the insulating base, and electrically isolated from each other. The third sensing electrodes are disposed on the second surface of the insulating base, and each third sensing electrode at least partially overlaps a portion of the first sensing electrodes and a portion of the second sensing electrodes.

13 Claims, 7 Drawing Sheets

TOUCH PANEL

BACKGROUND OF THE INVENTION

1. Field of the Invention

The present invention is related to a touch panel, and more particularly, to a capacitive touch panel utilizes three kinds of sensing signals respectively generated from the first sensing electrodes disposed on the first surface of the insulating base, the second sensing electrodes disposed on the first surface of the insulating base and the third sensing electrodes disposed on the second surface of the insulating base to achieve touch input function and decrease the number of connecting lines.

2. Description of the Prior Art

At present, in many kinds of the consumer electronic products, the touch panel has been widely applied to portable electronic products, such as tablet computer, personal digital assistant (PDA), mobile phone, global positioning system (GPS) and video player, to serve as communication interface for saving the volume of electronic products.

The technical developments of touch panel are diverse, and the most common touch technologies include resistive touch, capacitive touch and optical touch. The capacitive touch panel has advantages of high accuracy, multi-touch function, high endurance, and high touch resolution, and therefore the capacitive touch panel has been the mainstream of touch technologies used in medium-high level consumer electronic products. The operation of capacitive touch panel is based on a plurality of first sensing electrodes disposed along a first direction and a plurality of second sensing electrodes disposed along a second direction. When the touch input device, e.g. finger, performs a touch input, the horizontal coordinate and the vertical coordinate of the input point can be determined by detecting the respective capacitance changes of the first sensing electrodes and the second sensing electrodes. Accordingly, the touch input function can be realized. As illustrated above, the touch input function is feasible through two kinds of sensing electrodes disposed along different axes, however, due to the demand of high resolution or large touch panel size, the number of the first sensing electrodes and the number of the second sensing electrodes are meant to increase. Under this circumstance, the number of the connecting lines for transmitting sensing signals and the number of the driving chips increase as well. Consequently, the cost of touch panel raises, and the popularization of touch panel is adversely affected.

SUMMARY OF THE INVENTION

It is therefore one of the objectives of the present invention to provide a touch panel to decrease the number of the connecting lines and the number the driving chips for lowering the cost of touch panel.

According to an embodiment of the present invention, the present invention provides a touch panel. The touch panel includes an insulating base, a plurality of first sensing electrodes, a plurality of second sensing electrodes and a plurality of third sensing electrodes. The insulating base has a first surface and a second surface. The first sensing electrodes are disposed on the first surface of the insulating base, the second sensing electrodes are disposed on the first surface of the insulating base, and the first sensing electrodes and the second sensing electrodes are electrically isolated from each other. The third sensing electrodes are disposed on the second surface of the insulating base, and each third sensing electrode at least partially overlaps a portion of the first sensing electrodes and a portion of the second sensing electrodes.

The touch panel of the present invention utilizes three kinds of sensing signals respectively generated from the first sensing electrodes disposed on the first surface of the insulating base, the second sensing electrodes disposed on the first surface of the insulating base and the third sensing electrodes disposed on the second surface of the insulating base to determine the location of touch input. Accordingly, the number of the connecting lines and the number of the driving chips can be effectively decreased, and further, the cost of touch panel can be lowered as well.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be made in detail. The preferred embodiments of the present invention are illustrated in the accompanying drawings with numbered elements.

Figure 1:
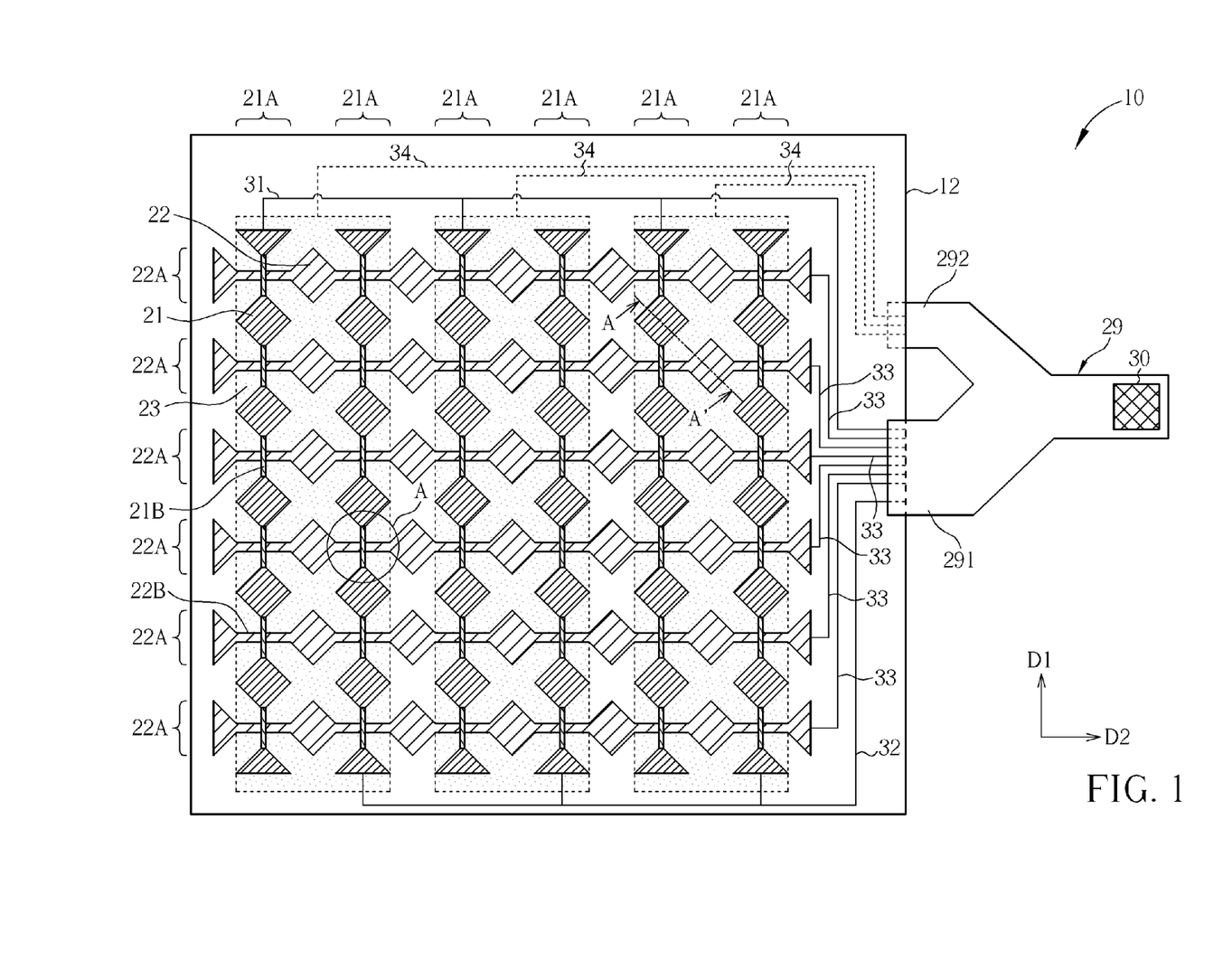
FIG. 1, FIG. 2A and FIG. 2B are schematic diagrams illustrating a touch panel according to a first exemplary embodiment of the present invention.
Figure 2A:
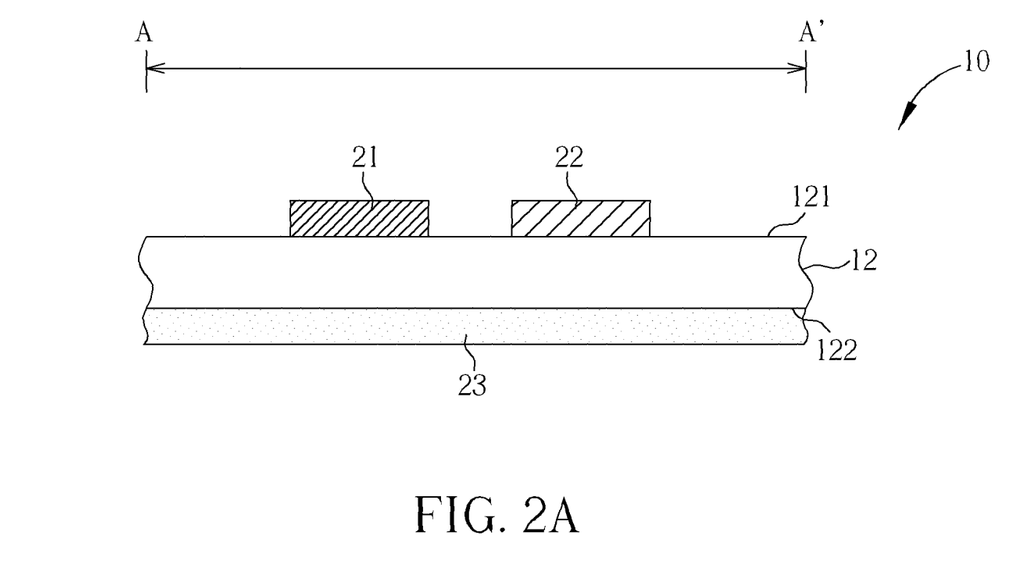
Figure 2B:
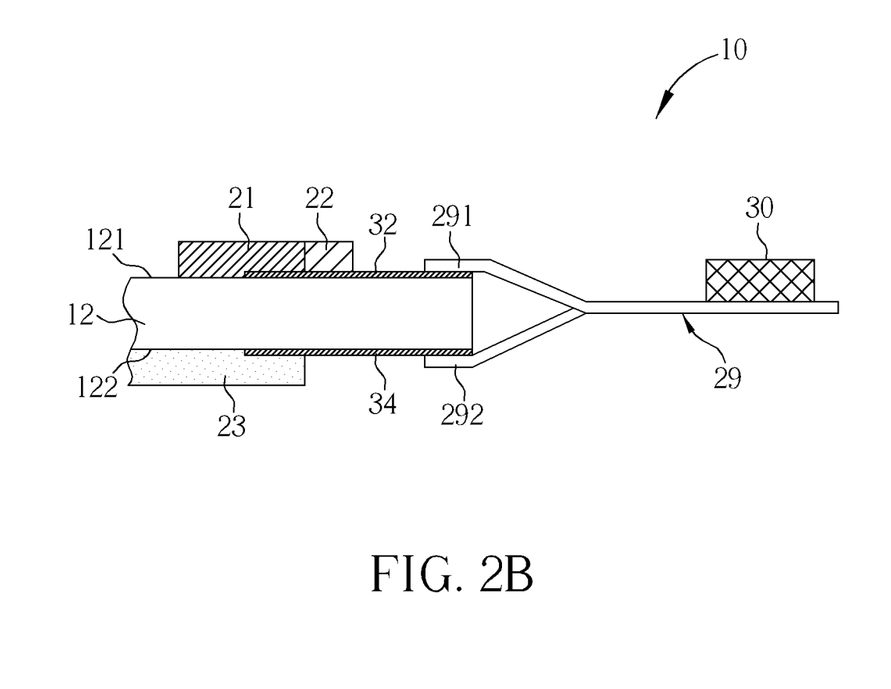

Capacitive touch panel is taken as an example in each exemplary embodiment of the present invention, but not limited thereto. Please refer to FIG. 1, FIG. 2A and FIG. 2B. FIG. 1, FIG. 2A and FIG. 2B are schematic diagrams illustrating a touch panel according to a first exemplary embodiment of the present invention. FIG. 1 is a top-view of a touch panel according to this exemplary embodiment. FIG. 2A is a cross-sectional view illustrating a touch panel taken along line AA' of FIG. 1 according to this exemplary embodiment. FIG. 2B is a side-view illustrating a part of a touch panel according to this exemplary embodiment. As shown in FIG. 1, FIG. 2A and FIG. 2B, a touch panel 10 of this exemplary embodiment includes an insulating base 12, a plurality of first sensing electrodes 21, a plurality of second sensing electrodes 22 and a plurality of third sensing electrodes 23. In this exemplary embodiment, the insulating base 12 could be a substrate. The substrate could be a firm substrate, e.g. glass substrate or quartz substrate, or a flexible substrate, e.g. plastic substrate. The insulating base 12 could be transparent or opaque, and the insulating base 12 is preferably transparent when applied in a display panel. The insulating base 12 has a first surface 121 and a second surface 122. The first sensing electrodes 21 and the second sensing electrodes 22 are disposed on the first surface 121 of the insulating base 12, and the first sensing electrodes 21 and the second sensing electrodes 22 are electrically isolated from each other. The third sensing electrodes 23 are disposed on the second surface 122 of the insulating base 12, and the third sensing electrodes 23 and the first sensing electrodes 21/the second sensing electrodes 22 are electrically isolated from each other as well. More specifically, the first sensing electrodes 21/the second sensing electrodes 22 and the third sensing electrodes 23 are disposed on different surfaces of the insulating base 12, and each third sensing electrode 23 at least partially overlaps a portion of the first sensing electrodes 21 and a portion of the second sensing electrodes 22. The first sensing electrodes 21, the second sensing electrodes 22 and the third sensing electrodes 23 are made of transparent conductive materials, but not limited thereto. Additionally, the first sensing electrodes 21 and the second sensing electrodes 22 could be defined by the same transparent conductive layer, but not limited thereto. In this exemplary embodiment, the first sensing electrodes 21 constitute a plurality of first sensing series 21A, and the first sensing series 21A are arranged along a first direction D1 and parallel to each other on the first surface 121 of the insulating base 12, and the neighboring first sensing electrodes 21 in the same first sensing series 21A may be electrically connected to each other by a bridge line 21B such as a metal line. The second sensing electrodes 22 constitute a plurality of second sensing series 22A, and the second sensing series 22A are arranged along a second direction D2 and parallel to each other on the first surface 121 of the insulating base 12, and the neighboring second sensing electrodes 22 in the same second sensing series 22A may be electrically connected to each other by another bridge line 22B. In this exemplary embodiment, the bridge lines 21B and the bridge lines 22B overlap each other. Accordingly, the bridge lines 21B and the bridge lines 22B are preferably made of different conductive materials, for instance, the bridge lines 21B are made of metal, while the second sensing electrodes 22 and the bridge lines 22B are defined by the same transparent conductive layer, but not limited thereto. To be exact, in this exemplary embodiment, the second sensing electrodes 22, the bridge lines 22B and the first sensing electrodes 21 are made of the same patterned transparent conductive layer, while the bridge lines 21B are made of another patterned conductive layer. The patterned transparent conductive layer and the another patterned conductive layer are located at different levels with an insulating layer (not shown) disposed therebetween, so that the bridge lines 21B do not contact the bridge lines 22B. The bridge lines 21B are electrically connected to the corresponding first sensing electrodes 21 through contact holes of the insulating layer. The third sensing electrodes 23 are arranged along a first direction D1 and parallel to each other on the second surface 122 of the insulating base 12, and the first direction D1 is different from the second direction D2. For instance, the first direction D1 represents a vertical direction in FIG. 1, while the second direction D2 represents a horizontal direction in FIG. 1, but not limited thereto.

The touch panel 10 of this exemplary embodiment further includes at least one driving chip 30, at least one first connecting line 31 and at least one second connecting line 32 disposed on the first surface 121 of the insulating base 12, a plurality of third connecting lines 33 disposed on the first surface 121 of the insulating base 12, and a plurality of fourth connecting lines 34 disposed on the second surface 122 of the insulating base 12. Each first connecting line 31, each second connecting line 32, each third connecting line 33 and each fourth connecting line 34 are electrically isolated from each other. A terminal of the at least one first connecting line 31 is electrically connected to a portion of the first sensing electrodes 21, while the other terminal of the at least one first connecting line 31 is electrically connected to the at least one driving chip 30. A terminal of the at least one second connecting line 32 is electrically connected to a portion of the first sensing electrodes 21, while the other terminal of the at least one second connecting line 32 is electrically connected to the at least one driving chip 30. A terminal of the third connecting line 33 is electrically connected to a portion of the second sensing electrodes 22, while the other terminal of the third connecting line 33 is electrically connected to the at least one driving chip 30. Accordingly, the at least one driving chip 30 can provide scan signals to the first sensing electrodes 21 and the second sensing electrodes 22, and receive sensing signals from the first sensing electrodes 21 and the second sensing electrodes 22. Additionally, a terminal of each fourth connecting line 34 is electrically connected to the third sensing electrode 23, while the other terminal of each fourth connecting line 34 is electrically connected to the at least one driving chip 30. Accordingly, the at least one driving chip 30 can provide scan signals to the third sensing electrode 23 through the fourth connecting lines 34. In this exemplary embodiment, the at least one driving chip 30 could be connected to the connecting lines including the at least one first connecting line 31, the at least one second connecting line 32, the third connecting lines 33 and the fourth connecting lines 34 by a flexible printed circuit board (FPC) 29. Specifically, the at least one first connecting line 31, the at least one second connecting line 32 and the third connecting lines 33 are disposed on the first surface 121 of the insulating base 12, while the fourth connecting lines 34 are disposed on the second surface 122 of the insulating base 12, and therefore the flexible printed circuit board 29 may include a first connecting section 291 and a second connecting section 292. The at least one driving chip 30 may be electrically connected to the at least one first connecting line 31, the at least one second connecting line 32 and the third connecting lines 33 disposed on the first surface 121 of the insulating base 12 through the first connecting section 291. The at least one driving chip 30 may also be electrically connected to the fourth connecting line 34 disposed on the second surface 122 of the insulating base 12 through the second connecting section 292. The at least one driving chip 30 could be disposed on the flexible printed circuit board 29 directly, or on another printed circuit board (not shown) electrically connected to the flexible printed circuit board 29. Furthermore, the number of the driving chip 30 is not constrained, for instance, the first sensing electrodes 21, the second sensing electrodes 22 and the third sensing electrodes 23 could be driven by different driving chips 30, respectively.

In this exemplary embodiment, a touch unit of the touch panel 10 includes 6n first sensing series 21A. The $(6m-5)^{th}$ first sensing series 21A, the $(6m-3)^{th}$ first sensing series 21A and the $(6m-1)^{th}$ first sensing series 21A are electrically connected to the first connecting line 31. The $(6m-4)^{th}$ first sensing series 21A, the $(6m-2)^{th}$ first sensing series 21A and the $(6m)^{th}$ first sensing series 21A are electrically connected to the second connecting line 32. The $(3m-2)^{th}$ third sensing electrode 23 at least partially overlaps the $(6m-5)^{th}$ first sensing series 21A and the $(6m-4)^{th}$ first sensing series 21A. The $(3m-1)^{th}$ third sensing electrode 23 at least partially overlaps the $(6m-3)^{th}$ first sensing series 21A and the $(6m-2)^{th}$ first sensing series 21A. The $(3m)^{th}$ third sensing electrode 23 at least partially overlaps the $(6m-1)^{th}$ first sensing series 21A and the $(6m)^{th}$ first sensing series 21A. In this exemplary embodiment, n is positive integer and m is a set of positive integers smaller than and equal to n. For instance, in a preferred embodiment, n is equal to 1, m is a set of positive integers smaller than and equal to 1, that is, m is equal to 1 as well, but not limited there to. In this condition, the touch unit of the touch panel 10 includes six first sensing series 21A. The $1^{st}$ first sensing series 21A, the $3^{rd}$ first sensing series 21A and the $5^{th}$ first sensing series 21A are electrically connected to the first connecting line 31, and the $2^{nd}$ first sensing series 21A, the 4$^{th}$ first sensing series 21A and the 6$^{th}$ first sensing series 21A are electrically connected to the second connecting line 32. Additionally, the 1$^{st}$ third sensing electrode 23 at least partially overlaps the 1$^{st}$ first sensing series 21A and the 2$^{nd}$ first sensing series 21A, the 2$^{nd}$ third sensing electrode 23 at least partially overlaps the 3$^{rd}$ first sensing series 21A and the 4$^{th}$ first sensing series 21A, and the 3$^{rd}$ third sensing electrode 23 at least partially overlaps the 5$^{th}$ first sensing series 21A and the 6$^{th}$ first sensing series 21A. It is appreciated that, in this exemplary embodiment, n is not limited to 1, and n may be any positive integer larger than 1, e.g. 2, 3 or any other positive integers. Furthermore, when n is positive integer larger than 1, for instance, when n is 2, m is a set of positive integers smaller than and equal to 2, that is, m is 1 and 2. Moreover, the touch unit of the touch panel 10 includes 6n first sensing series 21A, but not limited there to. The touch unit of the touch panel 10 could also include 4n first sensing series 21A, 8n first sensing series 21A, 10n first sensing series 21A, or any other amount of first sensing series 21A.

When a touch input occurs on an input point A which is located correspondingly to the 2$^{nd}$ first sensing series 21A and the 4$^{th}$ second sensing series 22A. The vertical coordinate of the input point A could be determined directly by means of the change of capacitance detected by the 4$^{th}$ second sensing series 22A. On the other hand, the first sensing series 21A corresponding to the input point A, i.e. the 2$^{nd}$ first sensing series 21A, can also detect the change of capacitance, but the 2$^{nd}$ first sensing series 21A, the 4$^{th}$ first sensing series 21A and the 6$^{th}$ first sensing series 21A are all electrically connected to the second connecting line 32. Therefore, the horizontal coordinate of the input point A could not be determined directly. However, the driving chip 30 may provide scan signals to each third sensing electrode 23 sequentially, such that the input point A could be found corresponding to the 2$^{nd}$ first sensing series 21A by means of a sequence of scan signals provided to each third sensing electrode 23 and the change of capacitance detected by the first sensing series 21A. Consequently, the horizontal coordinate of the input point A could be determined as a site corresponding to the 2$^{nd}$ first sensing series 21A.

Through the design detailed previously, only eleven connecting lines including one first connecting line 32, one second connecting line 32, six third connecting lines 33 and three fourth connecting lines 34 are required for the touch unit of the touch panel 10 having a touch resolution: 6*6. By Comparison, a touch unit of the conventional touch panel having a touch resolution 6*6 utilizes 12 connecting lines. Consequently, the number of the connecting lines and the number of the driving chips can be effectively decreased in the touch panel 10 of this exemplary embodiment, and further, the cost of the touch panel 10 can be lowered.

Figure 3:
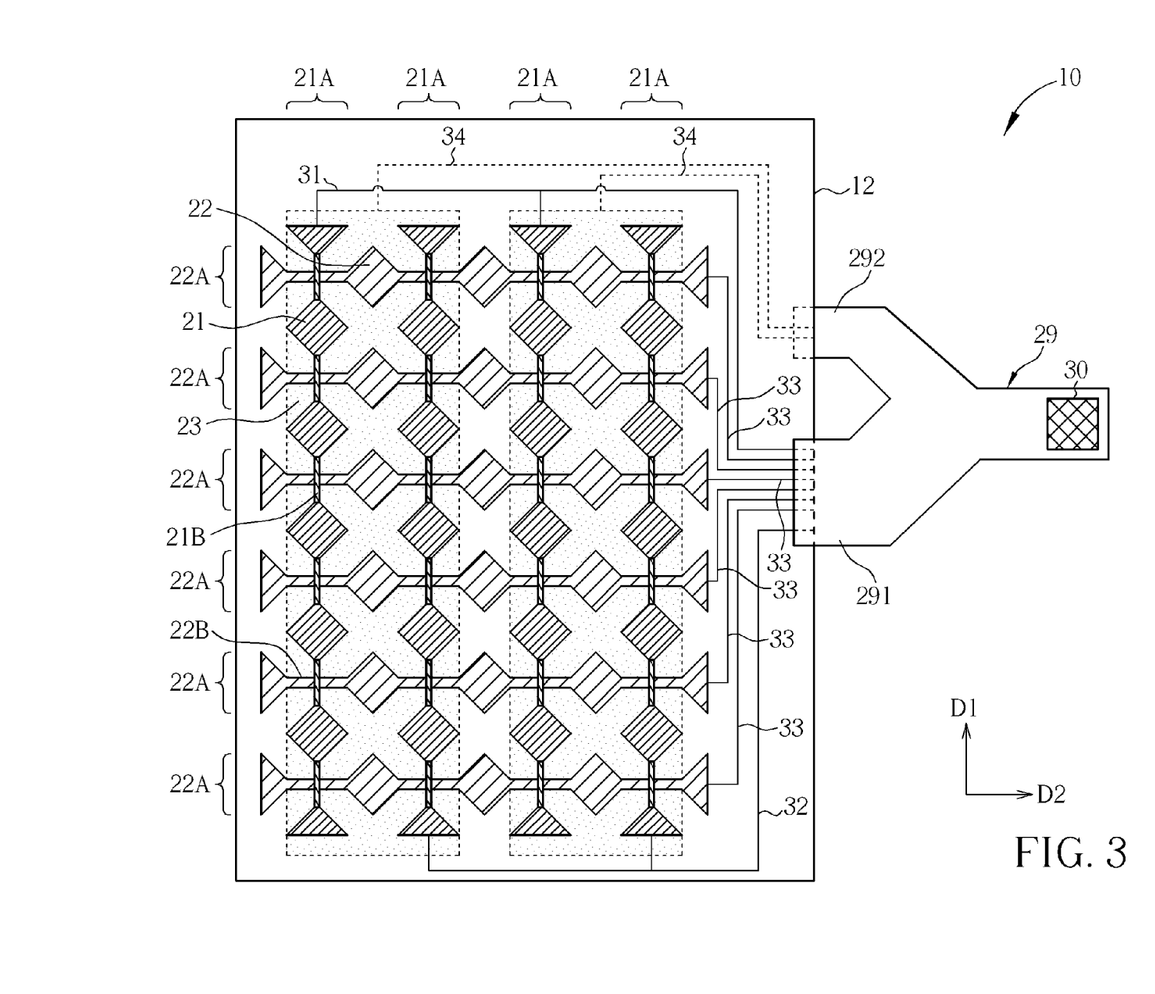
FIG. 3 is a top-view illustrating a variant of a touch panel according to a first exemplary embodiment of the present invention.

Please refer to FIG. 3, FIG. 3 is a top-view illustrating a variant of a touch panel according to a first exemplary embodiment of the present invention. As shown in FIG. 3, the difference between this variant and the previous exemplary embodiment is the number of first sensing series 21A. In this variant, a touch unit of the touch panel 10 includes 4n first sensing series 21A. The (4m−3)$^{th}$ first sensing series 21A and the (4m−1)$^{th}$ first sensing series 21A are electrically connected to the first connecting line 31. The (4m−2)$^{th}$ first sensing series 21A and the (4m)$^{th}$ first sensing series 21A are electrically connected to the second connecting line 32. The (2m−1)$^{th}$ third sensing electrode 23 at least partially overlaps the (4m−3)$^{th}$ first sensing series 21A and the (4m−2)$^{th}$ first sensing series 21A, while the (2m)$^{th}$ third sensing electrode 23 at least partially overlaps the (4m−1)$^{th}$ first sensing series 21A and the (4m)$^{th}$ first sensing series 21A. In this variant embodiment, n is a positive integer and m is a set of positive integers smaller than and equal to n. For instance, in a preferred embodiment of this variant, n is equal to 1, m is a set of positive integers smaller than and equal to 1, that is, m is equal to 1 as well, but not limited there to. In this condition, the first sensing series 21A include four first sensing series 21A. The 1$^{st}$ first sensing series 21A and the 3$^{rd}$ first sensing series 21A are electrically connected to the first connecting line 31, while the 2$^{nd}$ first sensing series 21A and the 4$^{th}$ first sensing series 21A are electrically connected to the second connecting line 32. Additionally, the 1$^{st}$ third sensing electrode 23 at least partially overlaps the 1$^{st}$ first sensing series 21A and the 2$^{nd}$ first sensing series 21A, while the 2$^{nd}$ third sensing electrode 23 at least partially overlaps the 3$^{rd}$ first sensing series 21A and the 4$^{th}$ first sensing series 21A. It is appreciated that, in this variant, n is not limited to 1, and n may be positive integer larger than 1, e.g. 2, 3 or any other positive integers.

Figure 4:
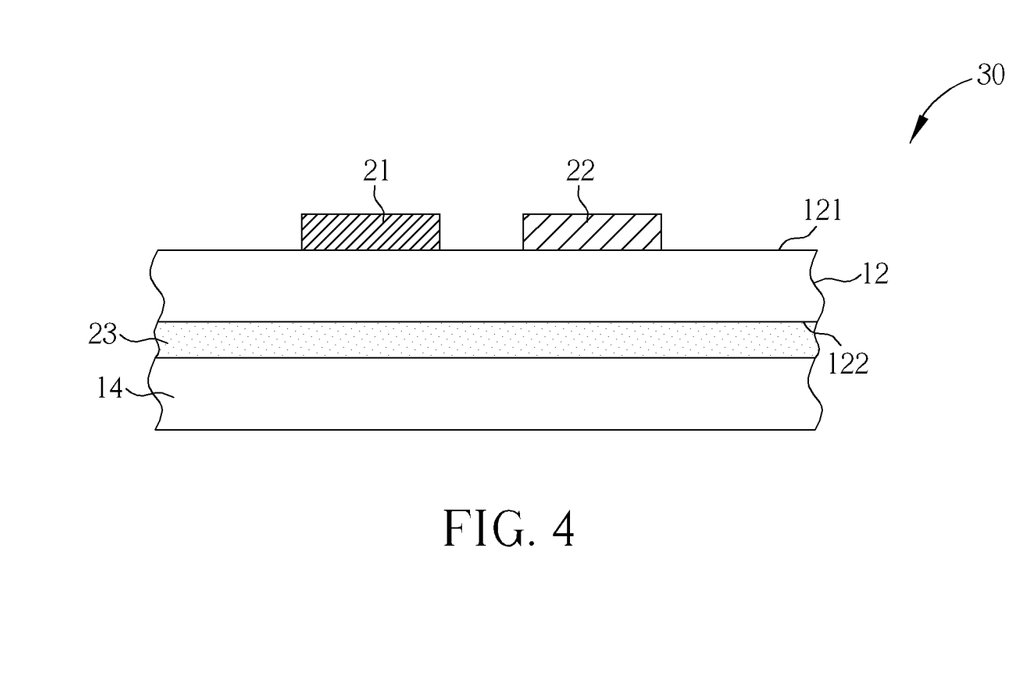
FIG. 4 is a cross-sectional view illustrating another variant of a touch panel taken along line AA' of FIG. 1 according to a first exemplary embodiment of the present invention.

Please refer to FIG. 4, FIG. 4 is a cross-sectional view illustrating another variant of a touch panel taken along line AA' of FIG. 1 according to a first exemplary embodiment of the present invention. As shown in FIG. 4, this variant differs from the exemplary embodiment of FIG. 1, FIG. 2A and FIG. 2B and the variant of FIG. 3 in structure. In this variant, a touch panel 30 further includes a substrate 14, and the insulating base 12 could be a planarization layer or a dielectric layer disposed on the substrate 14. Specifically, the first sensing electrodes 21 and the second sensing electrodes 22 are disposed on the first surface 121 of the insulating base 12 (planarization layer), while the third sensing electrodes 23 are disposed on the second surface 122 of the insulating base 12 (planarization layer), and the third sensing electrodes 23 are disposed between the insulating base 12 (planarization layer) and the substrate 14. In other exemplary embodiments of the present invention, the third sensing electrodes 23 could also be disposed on the first surface 121 of the insulating base 12 (planarization layer), while the first sensing electrodes 21 and the second sensing electrodes 22 could be disposed between the insulating base 12 (planarization layer) and the substrate 14. Furthermore, a touch unit of the touch panel 30 may include 6n first sensing series 21A (as disclosed in FIG. 1, FIG. 2A and FIG. 2B), 4n first sensing series 21A (as disclosed in FIG. 3), or any other amount of first sensing series 21A.

Figure 5:
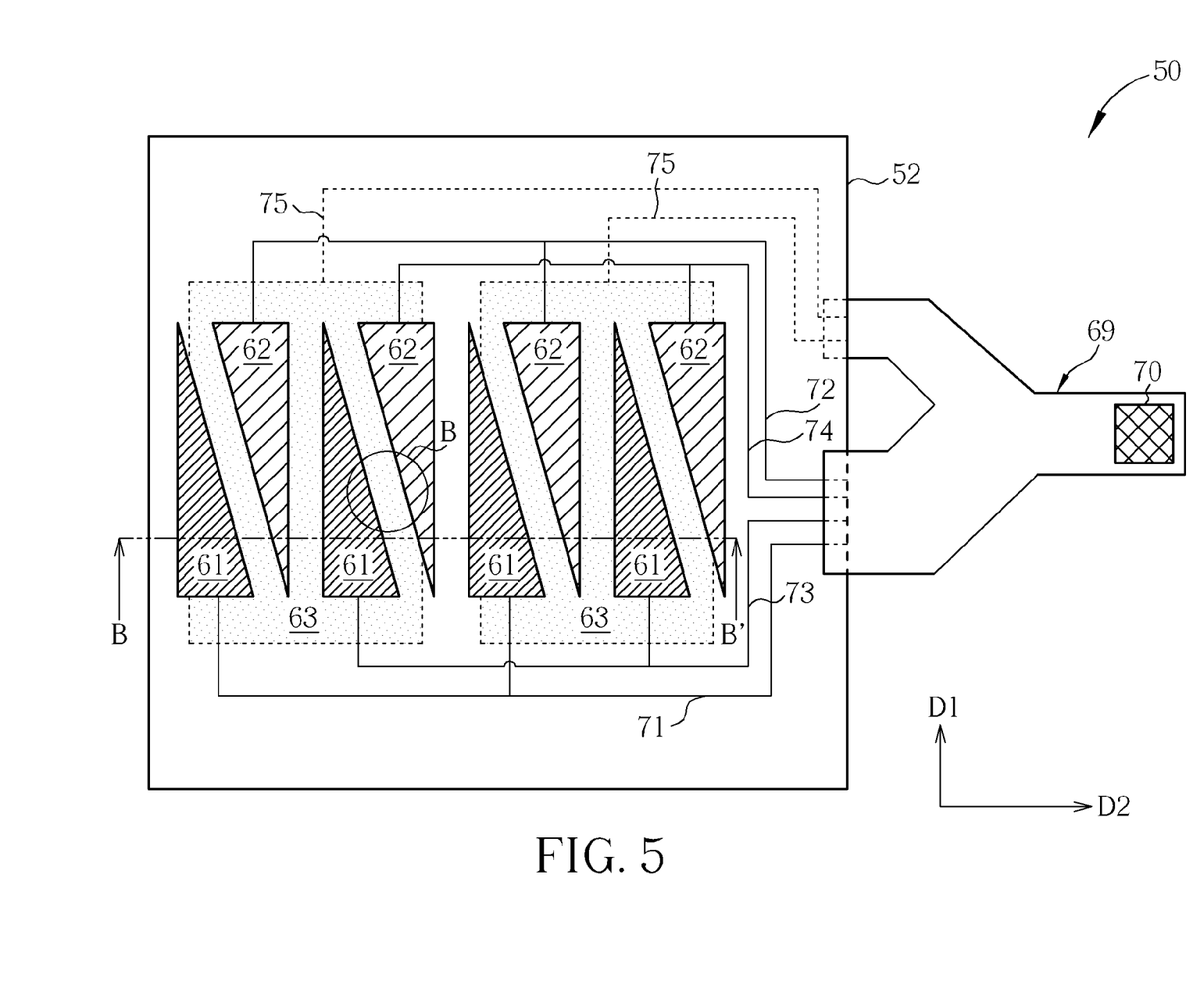
FIG. 5 and FIG. 6 are schematic diagrams illustrating a touch panel according to a second exemplary embodiment of the present invention.
Figure 6:
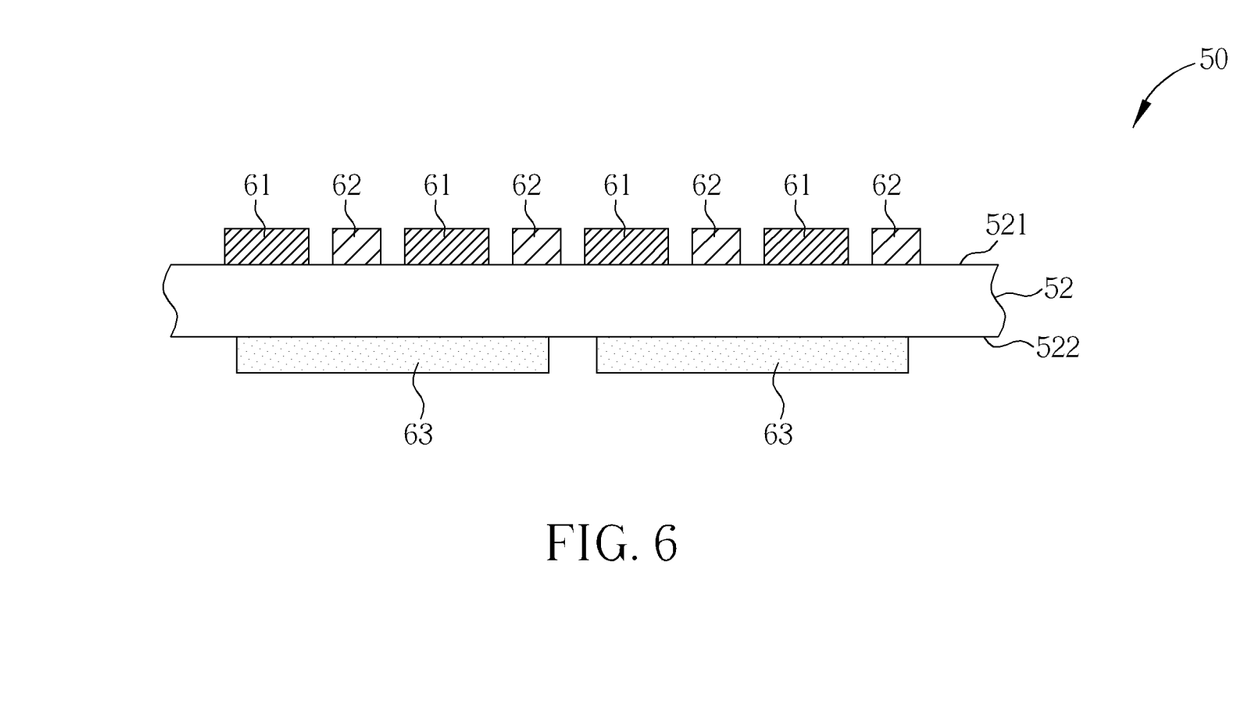

Please refer to FIG. 5 and FIG. 6. FIG. 5 and FIG. 6 are schematic diagrams illustrating a touch panel according to a second exemplary embodiment of the present invention. FIG. 5 is a top-view of a touch panel according to this exemplary embodiment. FIG. 6 is a cross-sectional view illustrating a touch panel taken along line BB' of FIG. 5 according to this exemplary embodiment. As shown in FIG. 5 and FIG. 6, a touch panel 50 of this exemplary embodiment includes an insulating base 52, a plurality of first sensing electrodes 61, a plurality of second sensing electrodes 62 and a plurality of third sensing electrodes 63. The insulating base 52 could be a firm substrate, e.g. glass substrate or quartz substrate, or a flexible substrate, e.g. plastic substrate, but not limited thereto; the insulating base 52 could also be a planarization layer or a dielectric layer. The insulating base 52 has a first surface 521 and a second surface 522. The first sensing electrodes 61 and the second sensing electrodes 62 are disposed on the first surface 521 of the insulating base 52, and the first sensing electrodes 61 and the second sensing electrodes 62 are electrically isolated from each other. The third sensing electrodes 63 are disposed on the second surface 522 of the insulating base 52, and the third sensing electrodes 63 and the first sensing electrodes 61/the second sensing electrodes 62 are electrically isolated from each other as well. In this exemplary embodiment, the first sensing electrodes 61 and the second sensing electrodes 62 are arranged alternately along a second direction D2 on the first surface 521 of the insulating base 52.

The touch panel 50 of this exemplary embodiment further includes at least one driving chip 70, at least one first connecting line 71, at least one second connecting line 72, at least one third connecting lines 73 and at least one fourth connecting lines 74 disposed on the first surface 521 of the insulating base 52, and a plurality of fifth connecting lines 75 disposed on the second surface 522 of the insulating base 52. Each first connecting line 71, each second connecting line 72, each third connecting line 73, each fourth connecting line 74 and each fifth connecting line 75 are electrically isolated from each other. A terminal of the at least one first connecting line 71 is electrically connected to a portion of the first sensing electrodes 61, while the other terminal of the at least one first connecting line 71 is electrically connected to the at least one driving chip 70. A terminal of the at least one second connecting line 72 is electrically connected to a portion of the second sensing electrodes 62, while the other terminal of the at least one second connecting line 72 is electrically connected to the at least one driving chip 70. A terminal of the at least one third connecting line 73 is electrically connected to a portion of the first sensing electrodes 61, while the other terminal of the at least one third connecting line 73 is electrically connected to the at least one driving chip 70. A terminal of the at least one fourth connecting line 74 is electrically connected to a portion of the second sensing electrodes 62, while the other terminal of the at least one fourth connecting line 74 is electrically connected to the at least one driving chip 70. Additionally, a terminal of each fifth connecting line 75 is electrically connected to the third sensing electrodes 63, while the other terminal of each fifth connecting line 75 is electrically connected to the at least one driving chip 70. The at least one driving chip 70 may be electrically connected to the at least one first connecting line 71, the at least one second connecting line 72, the at least one third connecting lines 73, the at least one fourth connecting lines 74, and the fifth connecting lines 75 by means of a flexible printed circuit board 69, and the connection way illustrated as previous exemplary embodiment is omitted here.

In this exemplary embodiment, a touch unit of the touch panel 50 includes 4n first sensing electrodes 61 and 4n second sensing electrodes 62. The $(4m-3)^{th}$ first sensing electrode 61 and the $(4m-1)^{th}$ first sensing electrode 61 are electrically connected to the first connecting line 71, while the $(4m-3)^{th}$ second sensing electrode 62 and the $(4m-1)^{th}$ second sensing electrode 62 are electrically connected to the second connecting line 72. The $(4m-2)^{th}$ first sensing electrode 61 and the $(4m)^{th}$ first sensing electrode 61 are electrically connected to the third connecting line 73, while the $(4m-2)^{th}$ second sensing electrode 62 and the $(4m)^{th}$ second sensing electrode 62 are electrically connected to the fourth connecting line 74. The $(2m-1)^{th}$ third sensing electrode 63 at least partially overlaps the $(4m-3)^{th}$ first sensing electrode 61, the $(4m-2)^{th}$ first sensing electrode 61, the $(4m-3)^{th}$ second sensing electrode 62 and the $(4m-2)^{th}$ second sensing electrode 62, while the $(2m)^{th}$ third sensing electrode 63 at least partially overlaps the $(4m-1)^{th}$ first sensing electrode 61, the $(4m)^{th}$ first sensing electrode 61, the $(4m-1)^{th}$ second sensing electrode 62 and the $(4m)^{th}$ second sensing electrode 62. In this exemplary embodiment, n is a positive integer and m is a set of positive integers smaller than and equal to n.

For instance, in a preferred embodiment of this exemplary embodiment, n is equal to 1, m is a set of positive integers smaller than and equal to 1, that is, m is equal to 1 as well, but not limited there to. In this condition, a touch unit of the touch panel 50 includes four first sensing electrodes 61 and four second sensing electrodes 62. The $1^{st}$ first sensing electrode 61 and the $3^{rd}$ first sensing electrode 61 are electrically connected to the first connecting line 71, while the $1^{st}$ second sensing electrode 62 and the $3^{rd}$ second sensing electrode 62 are electrically connected to the second connecting line 72. The $2^{nd}$ first sensing electrode 61 and the $4^{th}$ first sensing electrode 61 are electrically connected to the third connecting line 73, while the $2^{nd}$ second sensing electrode 62 and the $4^{th}$ second sensing electrode 62 are electrically connected to the fourth connecting line 74. Additionally, the $1^{st}$ third sensing electrode 63 at least partially overlaps the $1^{st}$ first sensing electrode 61, the $2^{nd}$ first sensing electrode 61, the $1^{st}$ second sensing electrode 62 and the $2^{nd}$ second sensing electrode 62, while the $2^{nd}$ third sensing electrode 63 at least partially overlaps the $3^{rd}$ first sensing electrode 61, the $4^{th}$ first sensing electrode 61, the $3^{rd}$ second sensing electrode 62 and the $4^{th}$ second sensing electrode 62. It is appreciated that, in this exemplary embodiment, n is not limited to 1, and n may be any positive integer larger than 1, e.g. 2, 3 or any other positive integers. Furthermore, when n is a positive integer larger than 1, for instance, when n is 2, m is a set of positive integers smaller than and equal to 2, that is, m is 1 and 2. Moreover, the touch unit of the touch panel 50 includes 4n first sensing electrodes 61 and 4n second sensing electrodes 62, but not limited there to, the touch unit of the touch panel 50 could also include 6n first sensing electrodes 61 and 6n second sensing electrodes 62, 10n first sensing electrodes 61 and 10n second sensing electrodes 62, or any other amount of first sensing electrodes 61 and any other amount of second sensing electrodes 62.

In addition, in this exemplary embodiment, each first sensing electrode 61 has a width gradually decreasing along a first direction D1, and each second sensing electrode 62 has a width gradually increasing along the first direction D1, e.g. each first sensing electrode 61 is a triangular sensing electrode, while each second sensing electrode 62 is an inverted triangular sensing electrode, as shown in FIG. 5. It is appreciated that a profile of each first sensing electrode 61 and a profile of each second sensing electrode 62 are not limited to triangular patterns, but any pattern having an increasing width or a decreasing width along the first direction D1 such as a trapezoid electrode.

The first sensing electrodes 61 and the second sensing electrodes 62 of the touch panel 50 include an increasing width and a decreasing width along the first direction D1, respectively. Accordingly, when a touch input occurs on an input point B which is located correspondingly to the $2^{nd}$ first sensing electrode 61 and the $2^{nd}$ second sensing electrode 62, the vertical coordinate of the input point B could be determined by means of the changes of capacitance detected by the $2^{nd}$ first sensing electrode 61 and the $2^{nd}$ second sensing electrode 62. On the other hand, the $2^{nd}$ first sensing electrode 61 and the $4^{th}$ first sensing electrode 61 are both electrically connected to the third connecting line 73, and the $2^{nd}$ second sensing electrode 62 and the $4^{th}$ second sensing electrode 62 are both electrically connected to the fourth connecting line 74. Therefore, the horizontal coordinate of the input point B could not be determined directly. However, the driving chip 70 may provide scan signals to each third sensing electrode 63 sequentially, such that the input point B could be found corresponding to the $2^{nd}$ first sensing electrode 61 and the $2^{nd}$ second sensing electrode 62 by means of a sequence of scan signals provided to each third sensing electrode 63. Consequently, the horizontal coordinate of the input point B could be determined as a site corresponding to the $2^{nd}$ first sensing electrode 61 and the $2^{nd}$ second sensing electrode 62.

Through the design detailed previously, only six connecting lines including one first connecting line 71, one second connecting line 72, one third connecting lines 73, one fourth connecting line 74 and two fifth connecting lines 75 are required for the touch panel 50 having four first sensing electrodes 61, four second sensing electrodes 62, and two third sensing electrodes 63. By comparison, the conventional touch panel having the same disposition of sensing electrodes utilizes ten connecting lines. Consequently, the number of the connecting lines and the number of the driving chips can be effectively decreased in the touch panel 50 of this exemplary embodiment, and further, the cost of the touch panel 50 can be lowered.

In conclusion, the touch panel of the present invention utilizes three kinds of sensing signals generated respectively to determine the location of touch input. Accordingly, the number of the connecting lines and the number of the driving chips can be effectively decreased, and the cost of touch panel can be lowered as well.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
an insulating base having a first surface and a second surface;
a plurality of first sensing series disposed on the first surface of the insulating base, wherein each of the first sensing series comprises a plurality of first sensing electrodes electrically connected to each other and arranged along a first direction;
a plurality of second sensing series disposed on the first surface of the insulating base, wherein each of the second sensing series comprises a plurality of second sensing electrodes electrically connected to each other and arranged along a second direction, the first direction is different from the second direction, and the first sensing series and the second sensing series are electrically isolated from each other;
a plurality of third sensing electrodes disposed on the second surface of the insulating base, wherein each of the third sensing electrodes at least partially overlaps two of the first sensing series and two of the second sensing series;
at least one driving chip for sequentially providing scan signals to each of the third sensing electrodes and for receiving sensing signals generated from the first sensing series and the second sensing series; and
at least one first connecting line and at least one second connecting line disposed on the first surface of the insulating base, wherein the at least one first connecting line is electrically connected to a portion of the plurality of the first sensing series, the at least one second connecting line is electrically connected to the other portion of the plurality of the first sensing series, and the at least one first connecting line and the at least one second connecting line are electrically isolated from each other, wherein the plurality of first sensing series comprises 4n first sensing series, the $(4m-3)^{th}$ first sensing series and the $(4m-1)^{th}$ first sensing series are electrically connected to the first connecting line, the $(4m-2)^{th}$ first sensing series and the $(4m)^{th}$ first sensing series are electrically connected to the second connecting line, and n is a positive integer and m is a set of positive integers smaller than or equal to n, and wherein the $(2m-1)^{th}$ third sensing electrode at least partially overlaps the $(4m-3)^{th}$ first sensing series and the $(4m-2)^{th}$ first sensing series, and the $(2m)^{th}$ third sensing electrode at least partially overlaps the $(4m-1)^{th}$ first sensing series and the $(4m)^{th}$ first sensing series.

2. The touch panel of claim 1, wherein the insulating base comprises a substrate.

3. The touch panel of claim 1, further comprising a substrate, wherein the insulating base comprises a planarization layer disposed on the substrate and the third sensing electrodes are disposed between the planarization layer and the substrate.

4. A touch panel, comprising:
an insulating base having a first surface and a second surface;
a plurality of first sensing series disposed on the first surface of the insulating base, wherein each of the first sensing series comprises a plurality of first sensing electrodes electrically connected to each other and arranged along a first direction;
a plurality of second sensing series disposed on the first surface of the insulating base, wherein each of the second sensing series comprises a plurality of second sensing electrodes electrically connected to each other and arranged along a second direction, the first direction is different from the second direction, and the first sensing series and the second sensing series are electrically isolated from each other;
a plurality of third sensing electrodes disposed on the second surface of the insulating base, wherein each of the third sensing electrodes at least partially overlaps two of the first sensing series and two of the second sensing series;
at least one driving chip for sequentially providing scan signals to each of the third sensing electrodes and for receiving sensing signals generated from the first sensing series and the second sensing series; and
at least one first connecting line and at least one second connecting line disposed on the first surface of the insulating base, wherein the at least one first connecting line is electrically connected to a portion of the plurality of the first sensing series, the at least one second connecting line is electrically connected to the other portion of the plurality of the first sensing series, and the at least one first connecting line and the at least one second connecting line are electrically isolated from each other, and wherein the plurality of first sensing series comprises 6n first sensing series, the $(6m-5)^{th}$ first sensing series, the $(6m-3)^{th}$ first sensing series and the $(6m-1)^{th}$ first sensing series are electrically connected to the first connecting line, and the $(6m-4)^{th}$ first sensing series, the $(6m-2)^{th}$ first sensing series and the $(6m)^{th}$ first sensing series are electrically connected to the second connecting line, wherein n is a positive integer and m is a set of positive integers smaller than or equal to n.

5. The touch panel of claim 4, wherein the $(3m-2)^{th}$ third sensing electrode at least partially overlaps the $(6m-5)^{th}$ first sensing series and the $(6m-4)^{th}$ first sensing series, the $(3m-1)^{th}$ third sensing electrode at least partially overlaps the $(6m-3)^{th}$ first sensing series and the $(6m-2)^{th}$ first sensing series, and the $(3m)^{th}$ third sensing electrode at least partially overlaps the $(6m-1)^{th}$ first sensing series and the $(6m)^{th}$ first sensing series.

6. The touch panel of claim 4, wherein the insulating base comprises a substrate.

7. The touch panel of claim 4, further comprising a substrate, wherein the insulating base comprises a planarization layer disposed on the substrate and the third sensing electrodes are disposed between the planarization layer and the substrate.

8. A touch panel, comprising:
- an insulating base having a first surface and a second surface;
- a plurality of first sensing series disposed on the first surface of the insulating base, wherein each of the first sensing series comprises only one first sensing electrode;
- a plurality of second sensing series disposed on the first surface of the insulating base, wherein each of the second sensing series comprises only one second sensing electrode, the first sensing series and the second sensing series are electrically isolated from each other, and the first sensing series and the second sensing series are disposed alternately along a second direction on the first surface of the insulating base;
- a plurality of third sensing electrodes disposed on the second surface of the insulating base, wherein each of the third sensing electrodes at least partially overlaps two of the first sensing series and two of the second sensing series;
- at least one driving chip for sequentially providing scan signals to each of the third sensing electrodes and for receiving sensing signals generated from the first sensing series and the second sensing series; and
- at least one first connecting line, at least one second connecting line, at least one third connecting line and at least one fourth connecting line disposed on the first surface of the insulating base, wherein the at least one first connecting line is electrically connected to a portion of the first sensing electrodes, the at least one second connecting line is electrically connected to a portion of the second sensing electrodes, the at least one third connecting line is electrically connected to the other portion of the first sensing electrodes, the at least one fourth connecting line is electrically connected to the other portion of the second sensing electrodes, and the at least one first connecting line, the at least one second connecting line, the at least one third connecting line and the at least one fourth connecting line are electrically isolated from each other, and wherein the first sensing electrodes of the first sensing series comprise 4n first sensing electrodes, the second sensing electrodes of the second sensing series comprise 4n second sensing electrodes, the $(4m-3)^{th}$ first sensing electrode and the $(4m-1)^{th}$ first sensing electrode are electrically connected to the at least one first connecting line, the $(4m-3)^{th}$ second sensing electrode and the $(4m-1)^{th}$ second sensing electrode are electrically connected to the at least one second connecting line, the $(4m-2)^{th}$ first sensing electrode and the $(4m)^{th}$ first sensing electrode are electrically connected to the at least one third connecting line, and the $(4m-2)^{th}$ second sensing electrode and the $(4m)^{th}$ second sensing electrode are electrically connected to the at least one fourth connecting line, wherein n is a positive integer and m is a set of positive integers smaller than or equal to n.

9. The touch panel of claim 8, wherein the $(2m-1)^{th}$ third sensing electrode at least partially overlaps the $(4m-3)^{th}$ first sensing electrode, the $(4m-2)^{th}$ first sensing electrode, the $(4m-3)^{th}$ second sensing electrode and the $(4m-2)^{th}$ second sensing electrode, and the $(2m)^{th}$ third sensing electrode at least partially overlaps the $(4m-1)^{th}$ first sensing electrode, the $(4m)^{th}$ first sensing electrode, the $(4m-1)^{th}$ second sensing electrode and the $(4m)^{th}$ second sensing electrode.

10. The touch panel of claim 8, wherein each of the first sensing electrodes has a width gradually decreasing along a first direction, each of the second sensing electrodes has a width gradually increasing along the first direction, and the first direction is different from the second direction.

11. The touch panel of claim 10, wherein each of the first sensing electrodes is substantially a triangular sensing electrode, and each of the second sensing electrodes is substantially an inverted triangular sensing electrode.

12. The touch panel of claim 8, wherein the insulating base comprises a substrate.

13. The touch panel of claim 8, further comprising a substrate, wherein the insulating base comprises a planarization layer disposed on the substrate and the third sensing electrodes are disposed between the planarization layer and the substrate.

* * * * *